United States Patent [19]
Yokota

[11] Patent Number: 5,410,525
[45] Date of Patent: Apr. 25, 1995

[54] DISK REPRODUCING METHOD AND APPARATUS INCLUDING TRACK JUMP COMPENSATION

[75] Inventor: Hachiro Yokota, Iwaki, Japan

[73] Assignee: Alpine Electronics, Inc., Tokyo, Japan

[21] Appl. No.: 173,532

[22] Filed: Dec. 21, 1993

[30] Foreign Application Priority Data

Dec. 28, 1992 [JP] Japan ................... 4-347736

[51] Int. Cl.$^6$ .............................................. G11B 7/00
[52] U.S. Cl. ........................................ 369/32; 369/47; 369/54
[58] Field of Search ............... 369/32, 44.28, 47, 48, 369/54, 58, 33, 124

[56] References Cited

U.S. PATENT DOCUMENTS

| | | | |
|---|---|---|---|
| 4,692,915 | 9/1987 | Moriya et al. | 369/54 |
| 4,779,252 | 10/1988 | Custers et al. | 369/32 |
| 4,817,075 | 3/1989 | Kikuchi et al. | 369/14 |
| 4,872,151 | 10/1989 | Smith | 369/14 |
| 5,148,417 | 9/1992 | Wong et al. | 369/32 |
| 5,317,553 | 5/1994 | Ohga et al. | 369/54 |

*Primary Examiner*—Georgia Y. Epps
*Assistant Examiner*—Tan Dinh
*Attorney, Agent, or Firm*—Guy W. Shoup; Norman R. Klivans; Patrick T. Bever

[57] ABSTRACT

A disk reproducing apparatus enables selection and reproduction of the desired programs recorded on a disk, with reduced memory capacity. When a desired program is selected using the operating panel, a system controller moves an optical pickup to the TOC area of the read-in region of a read-only mini-disk, causes the optical pickup, RF amplifier and digital signal processing circuit to read the start address of the desired program from the TOC area, thereafter again moves the optical pickup while observing the address data in the subdata input from the digital signal processing circuit, then searches the heading position of the desired program on the disk and starts reproduction of the desired program, upon completion of the searching operation.

13 Claims, 16 Drawing Sheets

FOR REPRODUCTION ONLY

FOR RECORDING AND REPRODUCTION

FIG. 3

| 12 | — | P-TN01 | P-TN02 | P-TN03 |
|---|---|---|---|---|
| ⋮ | ⋮ | ⋮ | ⋮ | ⋮ |
| 74 | P-TN0248 | P-TN0249 | P-TN0250 | P-TN0251 |
| 75 | P-TN0252 | P-TN0253 | P-TN0254 | P-TN0255 |
| ⋮ | ⋮ | ⋮ | ⋮ | ⋮ |
| 78 | START ADDRESS | | | TRACK MODE |
| 79 | END ADDRESS | | | — |
| 80 | START ADDRESS | | | TRACK MODE |
| 81 | END ADDRESS | | | — |
| ⋮ | | | | ⋮ |
| 586 | START ADDRESS | | | TRACK MODE |
| 587 | END ADDRESS | | | — |

Rows 78–79: TN01
Rows 80–81: TN02
Rows 586–587: TN0255

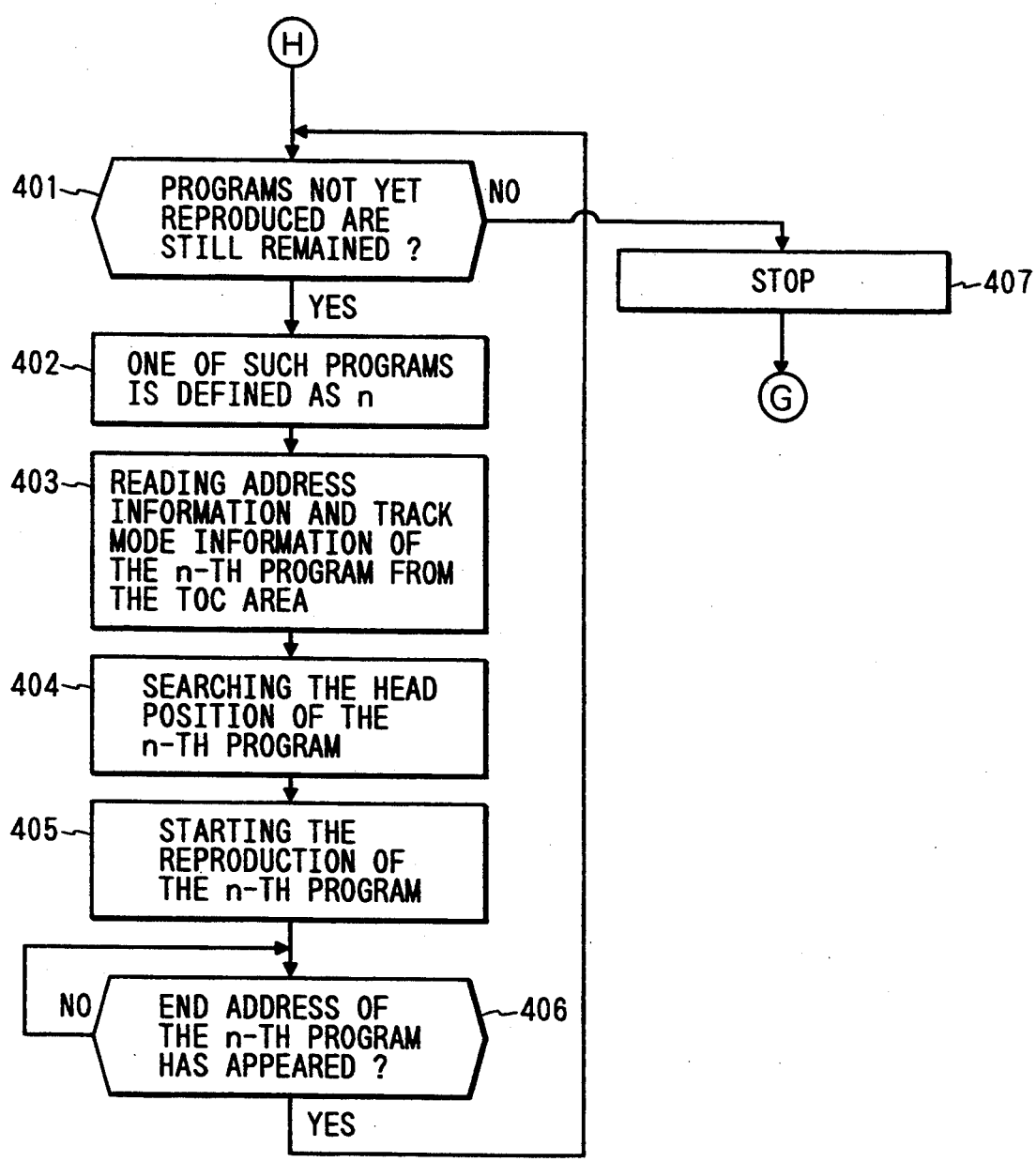

(PROGRAM FEED KEY IS DEPRESSED ONCE)

(PROGRAM RETURNING KEY IS DEPRESSED TWICE)

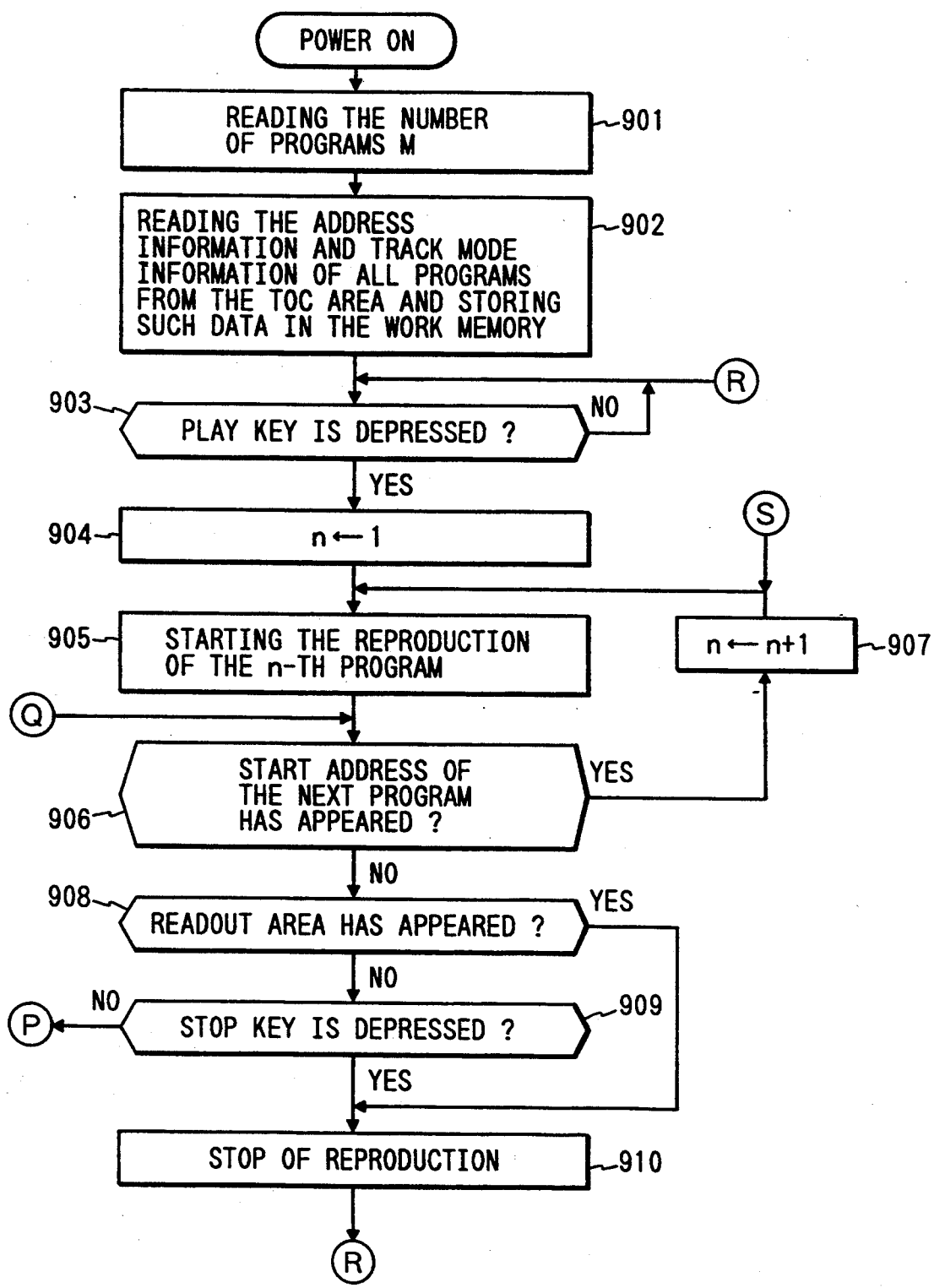

DISK REPRODUCING METHOD AND APPARATUS INCLUDING TRACK JUMP COMPENSATION

BACKGROUND OF THE INVENTION

1. Field of the Invention

The present invention relates to a method of reproducing a disk such as mini-disk (MD) or compact disk (CD) or the like, and more particularly to a method for reproducing desired programs using address information recorded in a TOC area of the disk.

2. Description of the Prior Art

The mini-disk eliminates deterioration of sound quality even after long use through digital recording of music just like a compact disk, but it is of smaller size than the compact disk and insures easy handling and improved durability through accommodation within a hard case. Moreover, the mini-disk has a recording time as long as that of the compact disk by digital recording of compressed music signals.

A system for playing a mini-disk intermittently reads data at high speed from the mini-disk, then writes data into a data memory and thereafter continuously reads such data from the data memory at normal speed. Even if the pickup jumps the track due to a shock during playback, and playback (reproduction) is discontinued or transiently interrupted, playback continues by returning the pickup to the initial position within a period when data still remains in the data memory. Therefore, such a mini-disk system is suitable for use in a car or for outdoor use, such as a portable mini-disk system.

In the case of a compact disk, TOC (table of contents) information is recorded in a read-in Q channel subcode. This TOC information includes playback start position information (playback start time) on the disk for each program (track number) and is used for searching, in the case of selecting and reproducing a desired program, the point where the absolute time recorded in the Q channel subcode of the program area matches the playback start time of the desired program, enabling playback of the desired program within a very short period by starting playback after searching for such a point.

In the case of a mini-disk, like a compact disk, position information consisting of the start address and end address for each program is recorded in the read-in TOC area for a reproduction only (read only) disk, or in the UTOC area (user TOC area) provided at the initial area of the program area for a disk (MD-MO mini disk magneto-optical) for both reproduction and recording (read-write). Accordingly, the desired program can be played within a short time by searching for the point where the address recorded in the subdata of the program area of the playback only disk or the address recorded in the pregroove of the reproduction and recording disk matches the start address of the desired program, and then starting playback after searching for such a point.

In the case of either a compact disk or mini-disk, until the time for starting playback, position information for all programs is read from the TOC area or UTOC area under the control of a system controller, the readout information is automatically stored in a work memory incorporated with the system controller, and the stored position information is held within the work memory until the disk is changed. For selection and playback of programs, the desired program is searched by making reference to the work memory.

However, in this case the position information about e.g., all 99 programs on a compact disk or all 255 programs on a mini-disk must actually be stored simultaneously in the work memory, and therefore a large memory area must be assigned for this purpose, resulting in the problem that acquisition of memory capacity required for other tasks is restricted and/or provision of sufficient memory capacity increases cost and prevents reduction in memory size.

For example, storing of all the start addresses and end addresses of the programs recorded on a mini-disk requires 1530 bytes, and requires 1785 bytes total including also track mode information.

BRIEF SUMMARY OF THE INVENTION

It is therefore an object of the present invention to provide a disk reproducing method which enables selection and reproduction of desired programs with minimum demand on memory capacity.

In accordance with the present invention, this is achieved by reading position information about a selected program from the TOC area of the disk when the desired program is selected, searching the position corresponding to the selected program in the disk, and starting playback of the selected program upon completion of the search.

According to the present invention, the desired program can be selected and reproduced by reading position information about the desired program from the TOC area of the disk when the desired program is selected, and searching for a position corresponding to the desired program on the disk.

Thereby it is no longer necessary to read position information about programs from the TOC area into the work memory, so that demand on the work memory capacity is alleviated, and thereby memory required for other tasks is readily available, saving cost and reducing memory size by reducing the required memory capacity.

Moreover, in a disk system for playing a disk by reading data intermittently at high speed from a disk recording position information about programs in its TOC area, then writing such data into the data memory and reading continuously the data at a normal speed from the data memory, in the case of selecting and reproducing a desired program by reading position information about the desired program from the TOC area while reading of the disk is interrupted and then storing such position information into the work memory so that the position information about the program which is currently reproduced and the predetermined number of successive programs are always held within the work memory, the reproduction is started after reading the position information about the desired program from the work memory when the desired program is selected and searching the position corresponding to the desired program in the disk.

Thereby, a plurality of desired programs can be quickly selected and reproduced in sequence, using only a small amount of memory capacity for storing position information about the relevant programs.

Furthermore, in the case of selecting and reproducing the desired programs by reading the start position information about all the programs from the TOC area of a disk and then storing such data in the work memory, reproduction is started after reading the start position of a desired program from the work memory when the desired program is selected and then searching the start position corresponding to the desired program in the disk.

Accordingly, speedy section and reproduction of all programs stored in the disk is realized while reducing the capacity required for the work memory to store the position information, even when the start position information and end position information about all programs is recorded in the TOC area of the disk.

BRIEF DESCRIPTION OF THE DRAWINGS

FIG. 3 is a diagram of a data format of the TOC area.

FIG. 7 is a fourth flowchart showing operations of a system controller in the first embodiment.

FIG. 15 is a first flowchart showing operations of a system controller of a third embodiment.

DETAILED DESCRIPTION OF THE PREFERRED EMBODIMENTS

Figure 1:
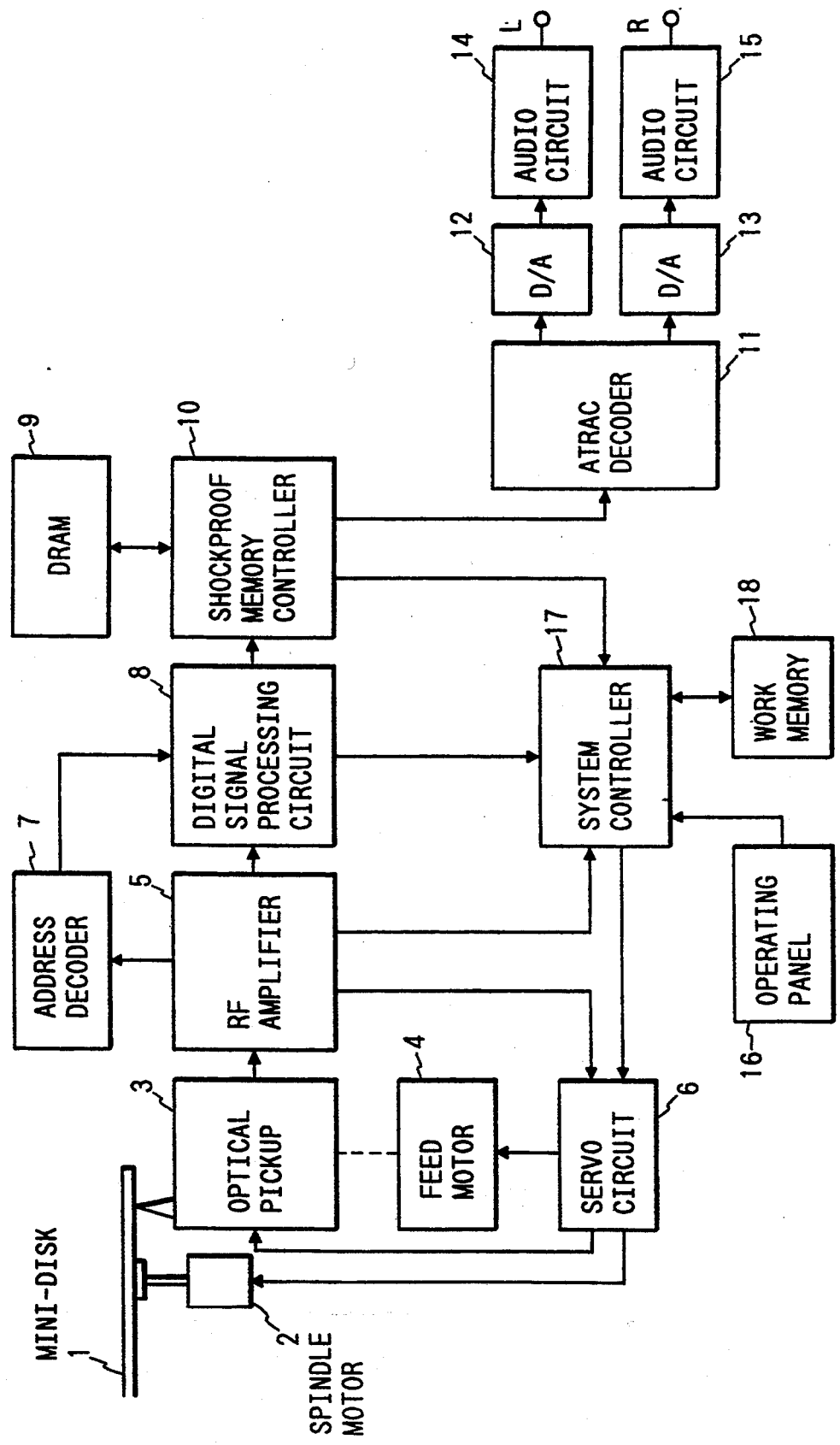
FIG. 1 is a block diagram of a mini-disk system embodying a first embodiment of the present invention.

FIG. 1 is a block diagram of a mini-disk system embodying a first embodiment of the present invention.

Compressed digital music signals are recorded on mini-disk 1; spindle motor 2 rotates the mini-disk at a predetermined constant high speed; optical pickup 3 detects recoded signal of the mini-disk; feed motor 4 feeds the optical pickup in the radius direction of the mini-disk; an RF amplifier 5 generates an EFM signal, error signal, address modulation signal (for a disk used both for recording and reproduction) and CLV control signal, etc. from the signal detected by the optical pickup. RF amplifier 5 also detects a jump of the optical pickup, and outputs a track jump detecting signal to a system controller described later.

Servo circuit 6 effectuates the predetermined servo function to the spindle motor, optical pickup and feed motor in accordance with a command issued from the system controller using an error signal, CLV control signal, etc.; an address decoder 7 demodulates an address from an address modulation signal outputted from the RF amplifier 5 for a mini-disk which is used both for recording and reproduction; a digital signal processing circuit 8 executes synchronization, disinterleave and error correction, etc. for the EFM signal to demodulate the TOC information (for the mini-disk for only reproduction) or UTOC information (for the mini-disk used both for recording and reproduction) in view of outputting the demodulated signal to the system controller and demodulates the compressed music data to output to a shock-proof memory controller described later. Digital signal processing circuit 8 also demodulates subdata recorded on the mini-disk in parallel with the compressed music data and then output such data to the system controller.

In the case of a mini-disk for reproduction only, an address indicating the position on the disk is included in the subdata. This address comprises the data indicating a cluster position on the disk, a sector position in the cluster and a sound group position in the sector.

In the case of a mini-disk used both for recording and reproduction, the address data are recorded with an interval of 13.3 ms in a pregroove spirally engraved on the disk.

DRAM 9 readably and recordably stores the compressed music data for the predetermined reproduction period, where data of about 3 seconds duration is stored in the case of 1M bit DRAM, while that of about 6 seconds is stored in the case of 2M bit DRAM; a shock-proof memory controller 10 intermittently writes, at high speed, compressed music data input from the digital signal processing circuit to DRAM 9 and continuously reads such a signal at a normal speed from DRAM 9 in parallel with such a write operation. Memory controller 10 notifies a data full condition to the system controller when DRAM 9 is full of compressed music data, and also interrupts temporarily the writing of the compressed music data, while continuing the read operation and thereafter notifies of a vacant region to the system controller 17 when a constant amount of vacant region is generated in DRAM 9 during the read operation of the compressed music data and thereafter restarts the write operation of the compressed music data input from the digital signal processing circuit 8.

Moreover, the shock-proof memory controller 10 temporarily interrupts the write operation of the compressed music data during continuation of the read operation, upon reception of the message indicating track jump due to shock from the system controller 17, and thereafter restarts the write operation of the compressed music data input from the digital signal processing circuit 8, upon reception of the in reset condition signal indicating that the optical pickup 3 is reset to the position before the occurrence of the track jump from the system controller 17.

An ATRAC (Adaptive TRansform Acoustic Coding) decoder 11 demodulates audio sample data for 2 channels from the compressed music data continuously input from the shock-proof memory controller 10; D/A converters 12, 13 are for both channels; audio circuits 14, 15 are for both channels for de-emphasizing emphasized programs under the control of the system controller. (ATRAC is the well known system for compressing digital signals used for recording on mini-disks.) The track mode information for each program is recorded in the read-in TOC area of the mini-disk for reproduction only and in the UTOC area at the beginning of the program area of the mini-disk used both for recording and reproduction, and data indicating whether emphasis is effectuated or not is included in the track mode information.

An operating panel 16 has a power ON key, a PLAY key, a STOP key, a program feed key, a program return key, a PRG key for reproduction of program and a program designation key to execute various operations for allowing a user to realize normal reproduction, reproduction of selected program and stopping reproduction; a system controller 17 realizes a desired reproducing operation for the user by system control in accordance with manipulation of the operating panel 16. System controller 17 issues various servo commands to a servo circuit 6, receives subdata and address data demodulated by the address decoder 7 from the digital signal processing circuit 8 and realizes pause control when it has received a data full message from the shock-proof memory controller 10 and thereafter realizes pause cancellation control when it has received a vacant region generating message.

Moreover, when a track jump detecting signal is input from the RF amplifier 5, the system controller 17 stores the addresses in the subdata input from the digital signal processing circuit 8 (in the case of the mini-disk for reproduction only) and addresses demodulated by the address decoder 7 (in the case of the mini-disk used both for recording and reproduction) and also provides notification of a track jump to the shock-proof memory controller 10. Thereafter, the system controller 17 executes a reset control for the optical pickup 3 to return to its position before the track jump and outputs a reset message to the shock-proof memory controller 10, upon completion of reset.

Figure 2A:
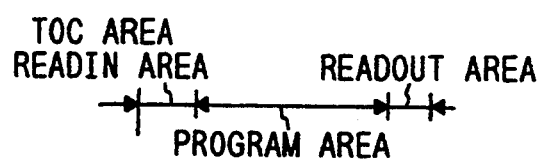
FIGS. 2(A) and 2(B) are diagrams of the structure of a mini-disk.

In addition, when selection and reproduction of the desired program are commanded via the operating panel 16, the system controller 17 moves the optical pickup 3 to the read-in area (refer to FIG. 2(A) in the case of the mini-disk for reproduction only to read the address information and track mode information of the desired program recorded in the TOC area (sector (O) of read-in area, refer to FIG. 3) and then moves the optical pickup 3 to the heading position of the desired program through the search control on the basis of the readout information, followed by initiation of the reproduction and necessary control signals for the audio circuits 14, 15.

Figure 2B:
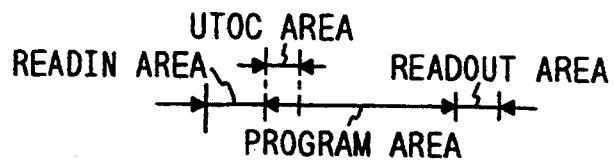

Moreover, in the case of the mini-disk used both for recording and reproduction, the system controller 17 moves the optical pickup 3 to the heading position of the program area (refer to FIG. 2(B) to read the address information and track mode information of the desired program recorded in the UTOC area and then moves the optical pickup 3 to the heading position of the desired program through the search control on the basis of the read-out information, followed by initiation of the reproduction and necessary control signals for audio circuits 14, 15.

FIG. 3 illustrates a part of the data recorded in the TOC area of the mini-disk for reproduction only. The numerals on the left side indicate data position in units of 4 bytes. The start address and end address of each program are recorded for a maximum of 255 programs using respectively three bytes of continuous two data positions, and the track mode information of the relevant program is recorded in the remaining one byte of the data position where the start address is recorded. P-TNOn (n=1 to 255) is a pointer which indicates the byte position where the heading one byte of the start address of the n-th program (TNOn) in the TOC area is stored.

Figure 8A:
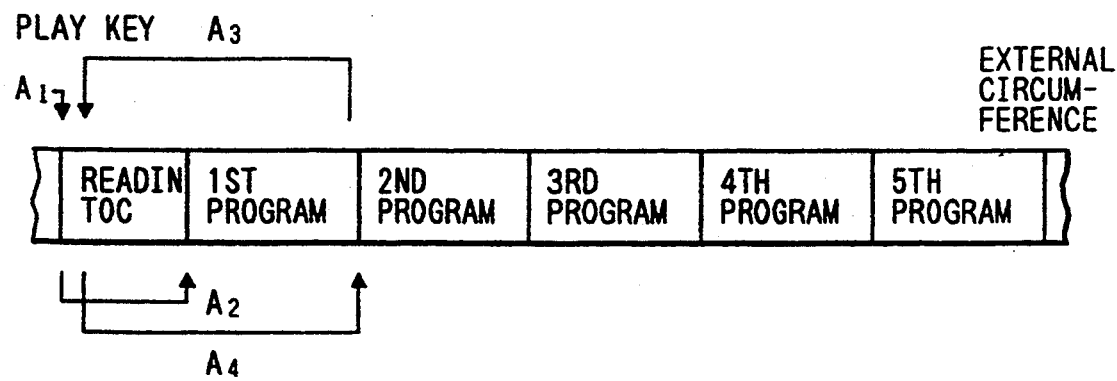
FIGS. 8(A), 8(B) and 8(C) are diagrams for explaining the reproducing operation of the first embodiment.
Figure 8B:
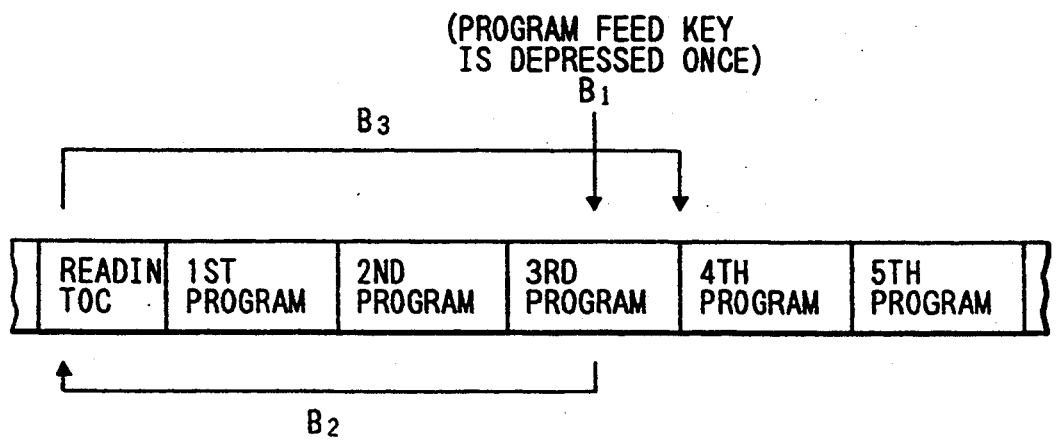
Figure 8C:
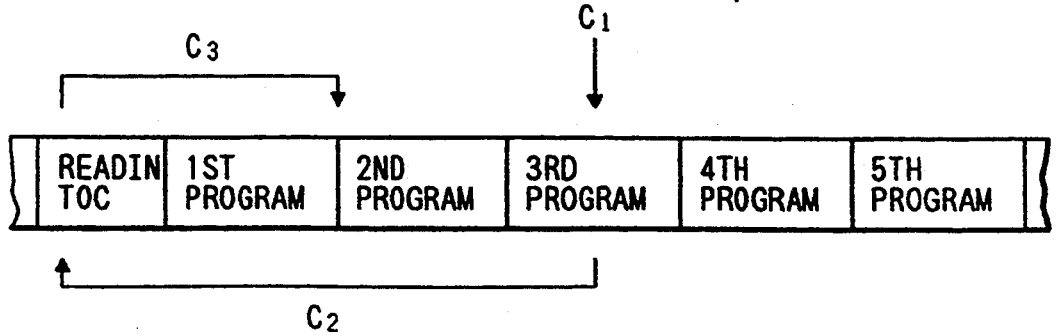

FIG. 4 to FIG. 7 are flowcharts for the system controller 17 and FIGS. 8(A), 8(B) and 8(C) are diagrams explaining the reproducing operation. The following description is with reference to these drawings.

It is first assumed that a mini-disk for reproduction only is in place in the system. When the power switch is turned on, system controller 17 activates the servo system, moves optical pickup 3 to the TOC area of the read-in area of the disk, causing the optical pickup 3, RF amplifier 5 and digital signal processing circuit 8 to read the number of programs M recorded on the disk and then stores data M in work memory 18 (step 101).

Thereafter, when the PLAY key is depressed, the system controller 17 sets n to 1 (n=1), because the current operation mode is not set to the program reproducing mode (steps 102 to 104), moves the optical pickup 3 to the TOC area of the read-in area of disk causing the optical pickup 3, RF amplifier 4, digital signal processing circuit 8 to read the start address, end address and track mode of the first program, temporarily stores the data in the work memory 18 (refer to step 105 and FIG. 8(A)A$_1$) and searches the heading part of the first program (TNO1) corresponding to the start address readout this time (refer to step 106 and FIG. 8(A)A$_2$). The search operation is carried out by repeating the seeking feed or track jump of the optical pickup 3, reading of subdata from the disk and checking whether the address in the subdata matches the start address or not. When the search operation is completed, the system controller 17 starts the reproduction and executes the ON/OFF control of deemphasis for the audio circuits 14, 15 in accordance with the track mode (step 107).

During reproduction, the system controller 17 executes the pause control, upon receiving a data-full message from the shock-proof memory controller 10 (steps 108, 109), temporarily interrupts reading of compressed music data, holds the optical pickup 3 at the predetermined position on the disk, then executes the pause canceling control (step 111), upon reception of a vacant area generation message (step 110), and thereafter restarts reading of the compressed music data from the position defined on the disk immediately before the pause control. Moreover, the system controller 17 stores, when the track jump detecting signal is input thereto from the RF amplifier 5, the address in the subdata input from the digital signal processing circuit 8 into the work memory 18 in this timing (steps 112, 113) and sends the track jump message to the shock-proof memory controller 10 (step 114) and restarts the reproduction after returning the optical pickup 3 to the position just immediately before the track jump (step 115) and sending a reset message to the shock-proof memory controller 10 (steps 116, 117).

When reproduction proceeds and the address in the subdata input from the digital signal processing circuit 8 matches the end address of the first program (YES in the step 118), the system controller 17 increments variable n (step 119). In step 105, the system controller 17 returns the optical pickup 3 to the TOC area and reads the start address, end address and track mode of the second program also to store temporarily in the work memory 18 (refer to FIG. 8(A)A$_3$). After searching the heading part of the second program, the system controller 17 starts the reproduction (steps 106, 107, and FIG.

8(A)A₄) and executes the necessary controls for the audio circuits 14, 15 in accordance with the track mode.

Hereinafter, the disk is reproduced sequentially and continuously from the first program by repeating similar operations.

When n has exceeded value M in step 119, n is reset to 1 and the operation skips to step 105.

Figure 4:
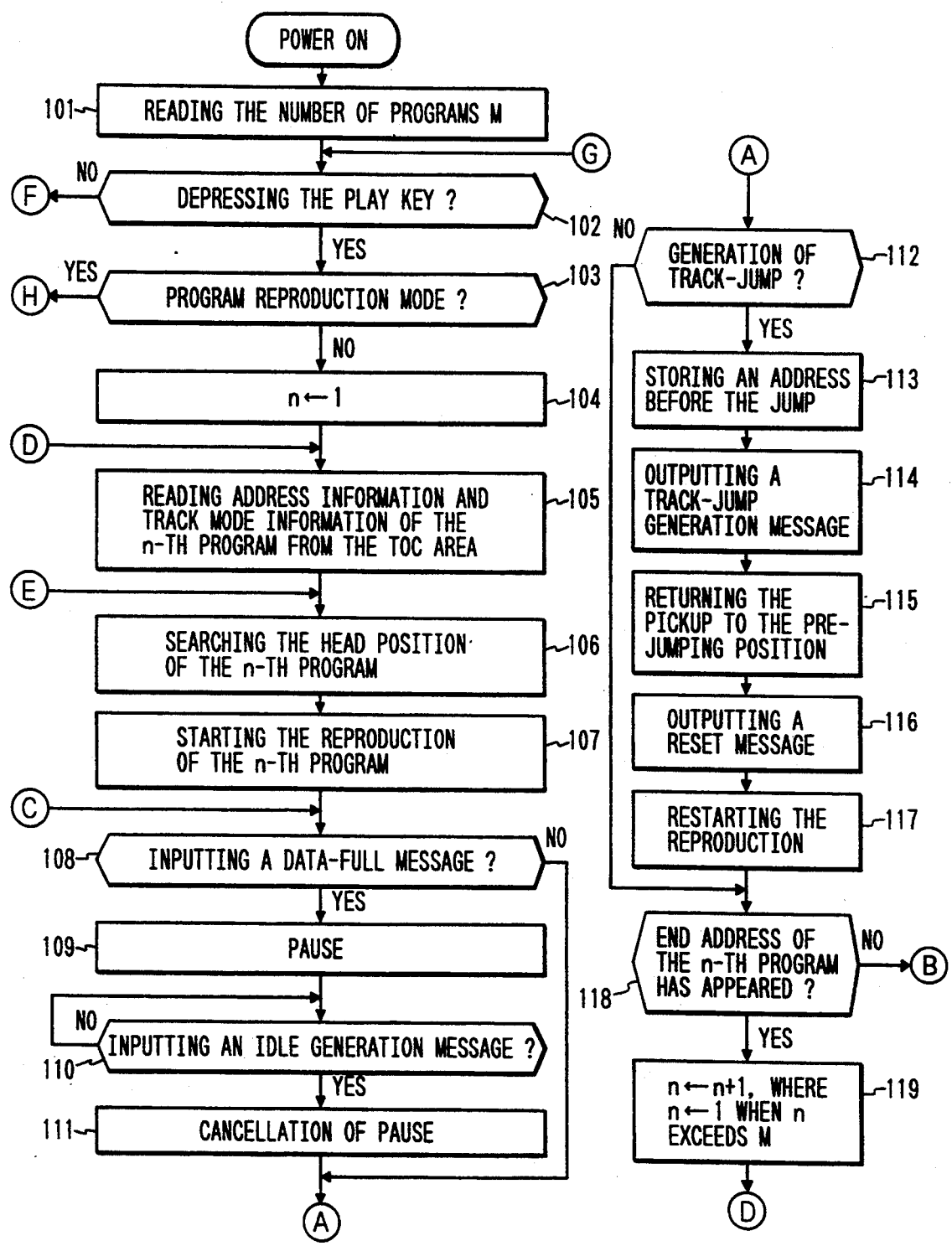
FIG. 4 is a first flowchart showing operations of a system controller in the first embodiment.
Figure 5:
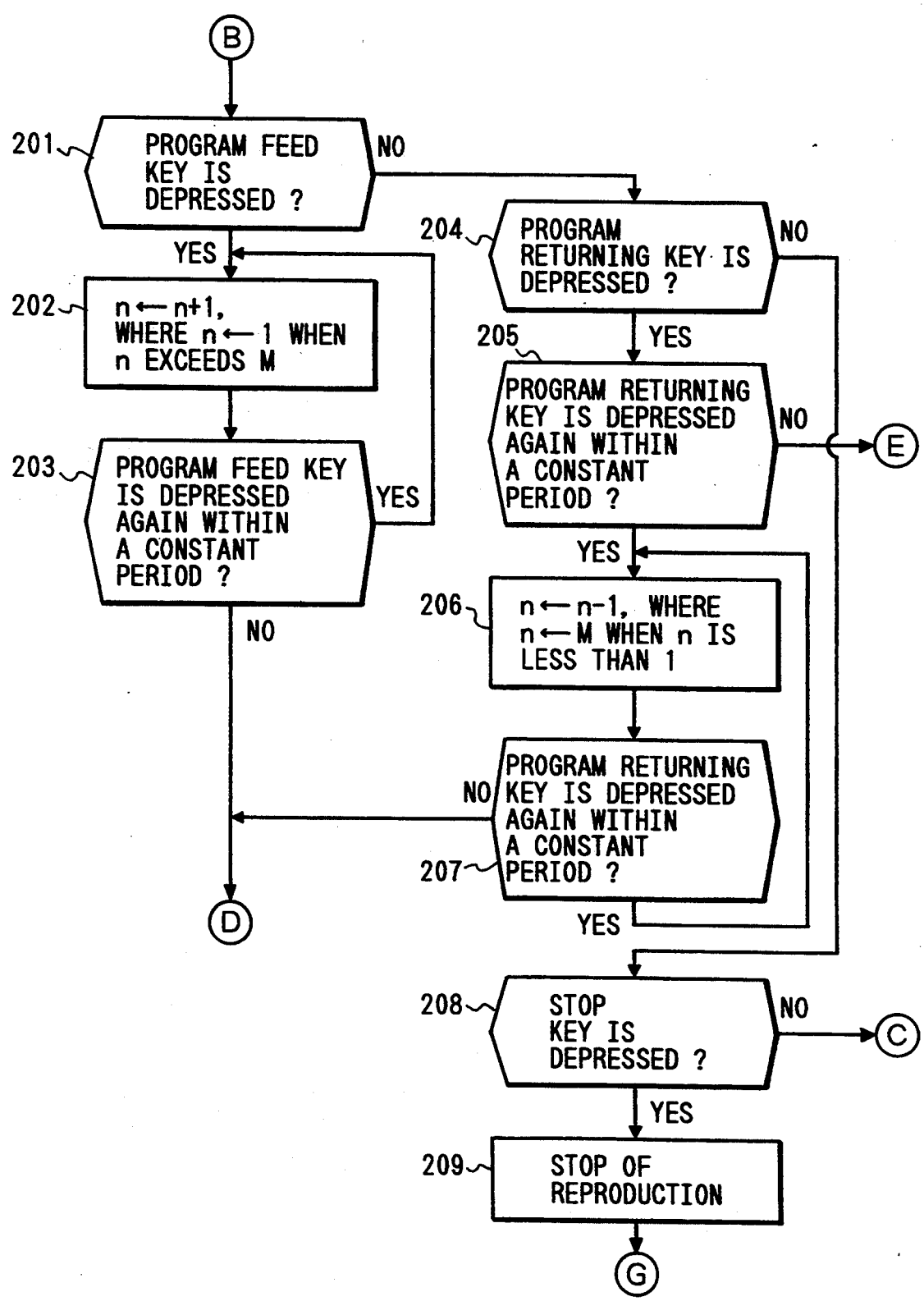
FIG. 5 is a second flowchart showing operations of a system controller in the first embodiment.

When the user intends, for example, to jump to the next program during reproduction of the third program and depresses the program feed key of operating panel 16 (refer to FIG. 8(B)B₁), the system controller 17 judges YES in step 201 of FIG. 5 and increases n to 4 (step 202), returns the optical pickup 3 to the TOC area in step 105 of FIG. 4 to read the start address, end address and track mode of the fourth program, temporarily stores these data in the work memory 18 (refer to FIG. 8(B)B₂) and starts reproduction after searching the heading part of the fourth program. Then the system controller 17 generates the necessary control signals for the audio circuits 14, 15 in accordance with the track mode (steps 106, 107, refer to FIG. 8(B)B₃). Thereby, the system controller starts reproduction of the fourth program.

If the user has depressed the program feed key several times during reproduction of a certain program, the system controller 17 increments n each time the program feed key is depressed (repetition of the steps 201, 202, 203 in FIG. 5) and returns the optical pickup 3 to the TOC area after a period of time has passed from the final depression of the program feed key (NO in the step 203) to read the start address, end address and track mode of the n-th program, thereafter temporarily stores such data in the work memory 18 and starts reproduction after searching the heading part of the n-th program. Then the system controller 17 generates the necessary control signals for the audio circuits 14, 15 in accordance with the track mode (steps 105 to 107).

On the contrary, when the user desires to return to the heading part of the third program during reproduction of the third program and depresses the program returning key of the operating panel 16, the system controller 17 judges YES in step 204 of FIG. 5, and searches the heading part of the third program by making reference to the start address of the third program stored previously in the work memory 18 in step 106 of FIG. 4 to restart reproduction (step 107), after confirming that the program returning key is not depressed continuously within a period (NO in the step 205).

Furthermore, when the user intends to return to the preceding program (second program) during reproduction of the third program and depresses the program returning key twice (refer to FIG. 8(C)C₁), the system controller 17 decrements variable n to 2 (steps 204 to 206 of FIG. 5), then returns the optical pickup 3 to the TOC area in step 105 of FIG. 4 after a period has passed (NO in step 207) from the second depression of the program feed key, to read the start address, end address and track mode of the second program, then temporarily stores the start address, end address and track mode of the second program in the work memory 18 (refer to FIG. 8(C)C₂) and searches the heading part of the second program to initiate the reproduction (refer to FIG. 8(C)C₃). Then, the system controller 17 executes the necessary controls for the audio circuits 14, 15 depending on the track mode (steps 106, 107).

If a user depresses the program returning key several times during reproduction of a certain program, the system controller 17 decreases n only (k−1) times (repetition of the steps 204, 205, 206 and 207 of FIG. 5), returns the optical pickup 3 to the TOC area after a constant time has passed from the final depression of the program returning key (NO in the step 207) to read the start address, end address and track mode of the n-th program and temporary stores these data in the work memory 18, and searches the heading part of the n-th program to initiate the reproduction thereof. Then, the system controller 17 also provides necessary control signals for the audio circuits 14, 15 depending on the track mode (steps 106, 107).

In step 206, when n becomes less than 1 by the decrement, n=M.

When the STOP key is depressed on the operating panel 15, system controller 17 executes stop control for the servo circuit 6 to stop reproduction (steps 208, 209 of FIG. 5). In the stop condition, the optical pickup 3 is in a waiting condition at its predetermined rest position.

Moreover, when the user intends to reproduce the fifth program in the reproduction stop condition, he depresses the PRG key on the operating panel 16 to set the program reproduction mode (steps 301 to 303) and then depresses the program designating key to designate the fifth program. Thereby, the fifth program is registered in the work memory 18 (step 305 to 307). However, when the program number is larger than M in the step 307, such a number is not registered as the program number and is neglected. Thereafter, when the PLAY key is depressed, the system controller 17 sets the first program number (here, 5 as designated above) to n (steps 102, 103 of FIG. 4, steps 401, 402 of FIG. 7), moves the optical pickup 3 to the TOC area to read the start address, end address and track mode of the fifth program, temporarily stores these data in the work memory 18 (step 403) and then searches the heading part of the fifth program to start reproduction (steps 404, 405).

Thereafter, when reproduction of the fifth program proceeds and the address input from the digital signal processing circuit 6 matches the end address of the fifth program (YES in the step 406), it is checked whether unreproduced programs still exist or not (step 401). When no such program exists, stop control is carried out (step 407) and when an unreproduced program still exists, the processing explained above is carried out at the step 402.

Figure 6:
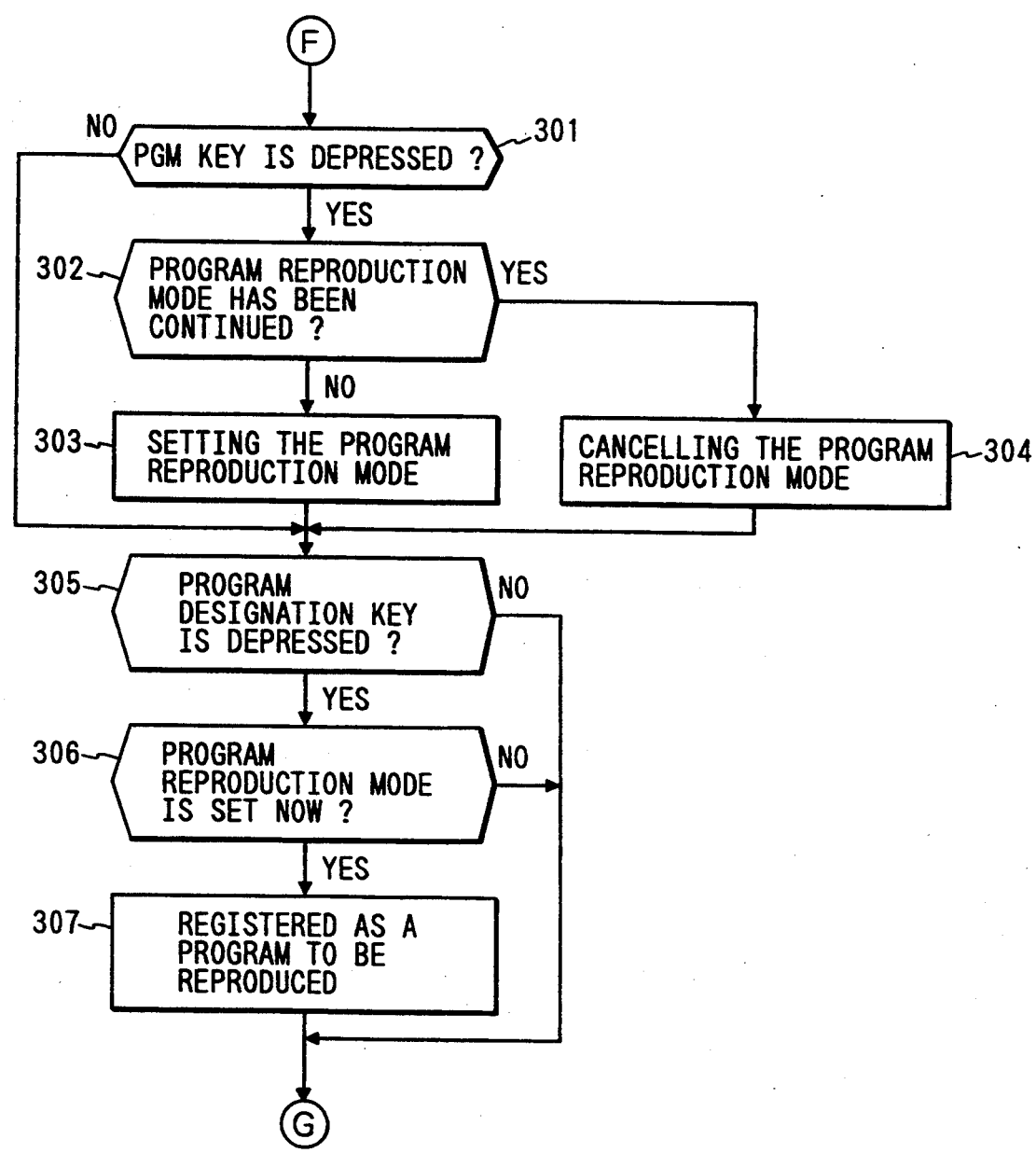
FIG. 6 is a third flowchart showing operations of a system controller in the first embodiment.

The program mode is canceled by again depressing the PRG key (steps 301, 302, 304 of FIG. 6).

According to this embodiment, after the power switch is turned ON, it does not happen that the address information and track mode information of all programs stored in the TOC area of the disk read-in are read out and then stored in the work memory, but when the address information and track information of a certain program are required for searching and reproduction, such data are individually read from the read-in TOC area. Accordingly, it is always required to acquire the storage area only for the address information and track mode information of the one program. Therefore, it is easy to achieve other sophisticated functions by assigning the work memory for other processing such as display of characteristics, etc., or cost reduction or memory size reduction can be achieved easily by reducing the memory capacity.

On the other hand, in the prior art, it is required to assign memory capacity for storing the address information and track information of 255 programs in the work memory, so it has been required to provide a large memory storage area.

In the above embodiment, the track mode information is read out together with the address information, but the track mode information is not always required to be read in the case of a disk player not including the audio circuits 14, 15. In the case where the track mode information is not read out, when a plurality of programs are reproduced in an ascending sequence, it is only required to continuously move the optical pickup 3 in the external circumferencial direction of the disk. Accordingly, it is no longer necessary to read the start address and end address of the next program by returning to the TOC area.

Moreover, when program reproduction is not required, reading of the end address can be omitted.

Figure 13A:
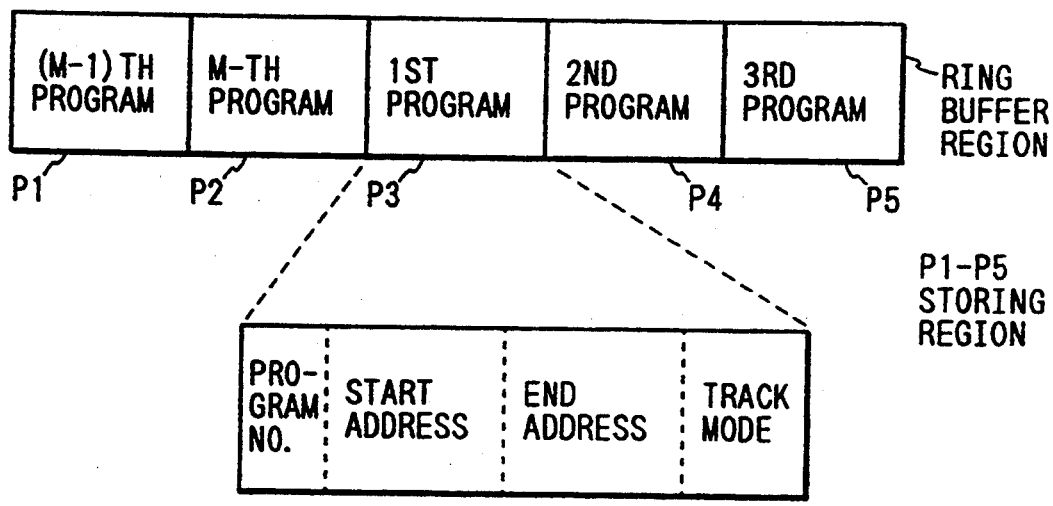
FIGS. 13(A), 13(B) and 13(C) are diagrams showing data to be stored in a ring buffer area of the work memory.
Figure 13B:
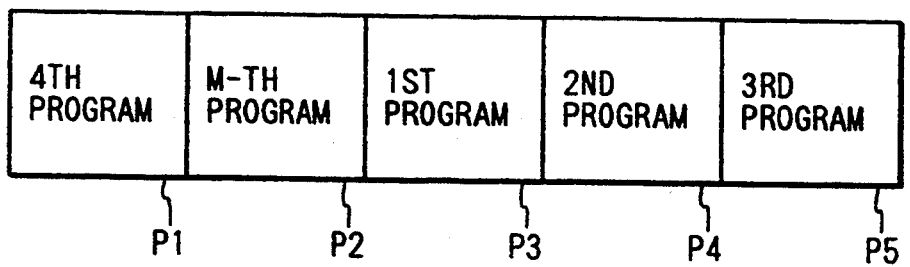
Figure 13C:
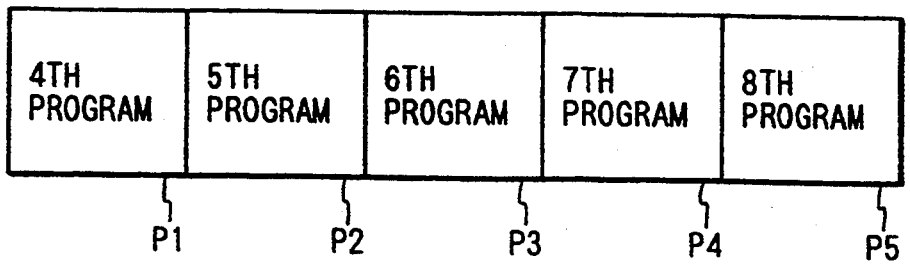
Figure 14A:
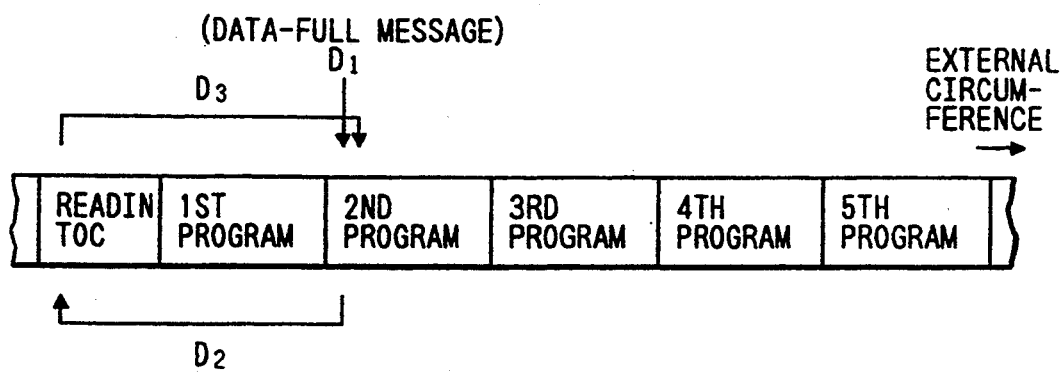
FIGS. 14(A), 14(B) and 14(C) are diagrams showing the reproducing operation of the second embodiment.
Figure 14B:
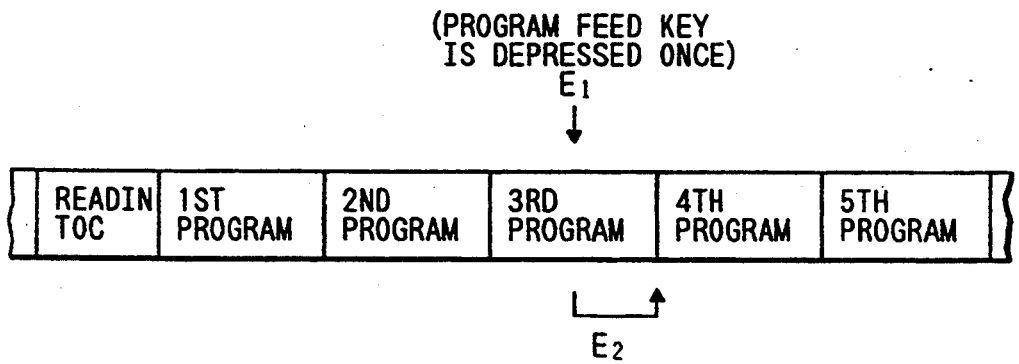
Figure 14C:
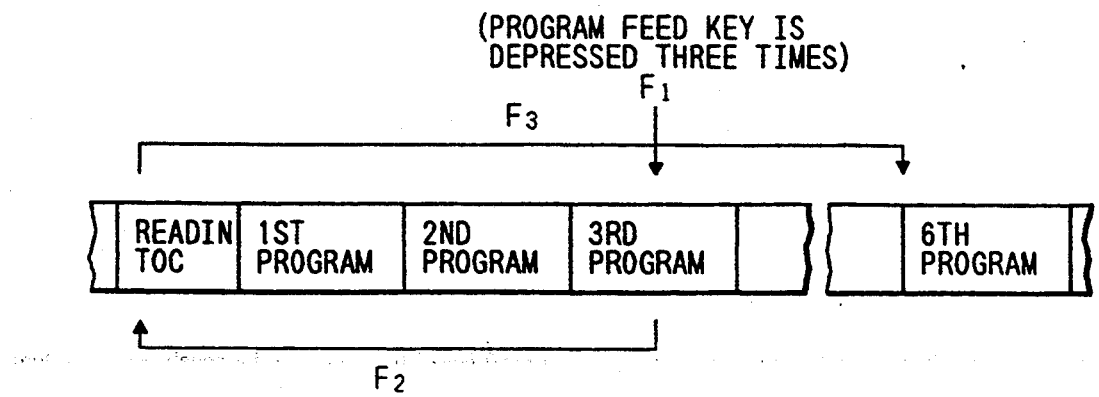

FIG. 9 to FIG. 12 are flowcharts for the system controller operation in a second embodiment of the present invention. FIGS. 13(A), 13(B) and 13(C) are diagrams of address information, etc. to be stored in the work memory. FIGS. 14(A), 14(B) and 14(C) are diagrams of the reproducing operation of the second embodiment of the present invention.

Here, it is assumed that a mini-disk (for reproduction only) recording 20 programs in total is set in the system.

When the power switch is turned on, system controller 17 activates a servo mechanism, moves an optical pickup 3 to the read-in TOC area of the disk to read the number of programs M=20 recorded on the disk with the optical pickup 3, RF amplifier 4 and digital signal processing circuit 8, then once stores these data in work memory 18 (step 501) and simultaneously reads the start address, end address and track mode of the five programs including the 1st to 34d programs, 19th program and 20th program to store these data together with the program numbers into the divided storing regions P1 to P5 of a ring buffer region provided on the work memory 18 (step 502, refer to FIG. 13(A).

Thereafter, when the PLAY key is depressed, the system controller 17 sets variable n to 1 (n=1) because the system is not set in the program reproduction mode at the beginning and then starts reproduction from the heading part of the first program. Then, the system controller 17 executes the de-emphasis ON/OFF control for the audio circuits 14, 15 depending on the track mode of the first program stored in the ring buffer region (steps 503 to 506).

During reproduction, the system controller 17 executes the pause control, upon reception of a data-full message from the shock-proof memory controller (steps 507, 508) and temporarily interrupts the read operation of the compressed music data. During the pause mode, the system controller 17 checks whether the address and track mode information of the five programs including two preceding programs and two successive programs of the program number 1 which is reproduced currently are stored or not in the ring buffer memory region (step 509). Since these are stored, in this case, the system controller 17 waits for input of a vacant area generation message (step 510). Upon reception of the vacant area generation message, the system controller 17 executes pause cancellation control (step 511) and restarts the read operation of the compressed music data from the position defined immediately before entering the pause mode of the disk.

Moreover, when the track jump detecting signal is input from the RF amplifier 5 (YES in the step 512), the system controller 17 stores the latest address in the subdata input from the digital signal processing circuit 8 in the work memory 18 (step 513), sends the track jump generation message to the shock-proof memory controller 10 (step 514), returns the optical pickup 3 to the position defined before the jump, sends a reset message to the shock-proof memory controller 10 and thereafter restarts reproduction (steps 515 to 517).

When reproduction proceeds during the pause mode and the address in the subdata inputted from the digital signal processing circuit 8 matches the end address of the first program (YES in step 518), the system controller 17 increases n (step 107), executes de-emphasis ON/OFF control for the audio circuits 14, 15 depending on the track mode of the second track mode stored in the ring buffer memory region and thereafter starts reproduction of the second program (step 506).

When the system enters the pause mode because DRAM 9 shows a data-full condition during reproduction of the second program (refer to FIG. 14(A)D$_i$), the system controller 17 checks whether the address information and track mode information of five programs including the program number 2 which is currently reproduced, two preceding programs, program numbers 1 and M, and two successive programs, program numbers 3 and 4 are stored or not in the ring buffer memory region (step 509). Here, since information regarding the fourth program does not exist and the result of the judgment is NO, the system controller 17 moves the optical pickup 3 to the read-in TOC area to read the start address, end address and track mode of the fourth program and stores such data together with the program number 4 into the first storing area P1 of the ring buffer region (step 520, refer to FIG. 13(B), FIG. 14(A)D$_2$). Thereafter, the system controller 17 returns the optical pickup 3 to the initial pause position and proceeds the processing to the step 510 under the pause condition (refer to FIG. 14(A)D$_3$).

Hereafter, similar processing is repeated to always hold the address information and track information of the five programs including the program which is currently being reproduced and two preceding programs and two successive programs thereof in the ring buffer memory region, while sequentially and continuously reproducing the programs beginning from the first program of the disk.

Figure 9:
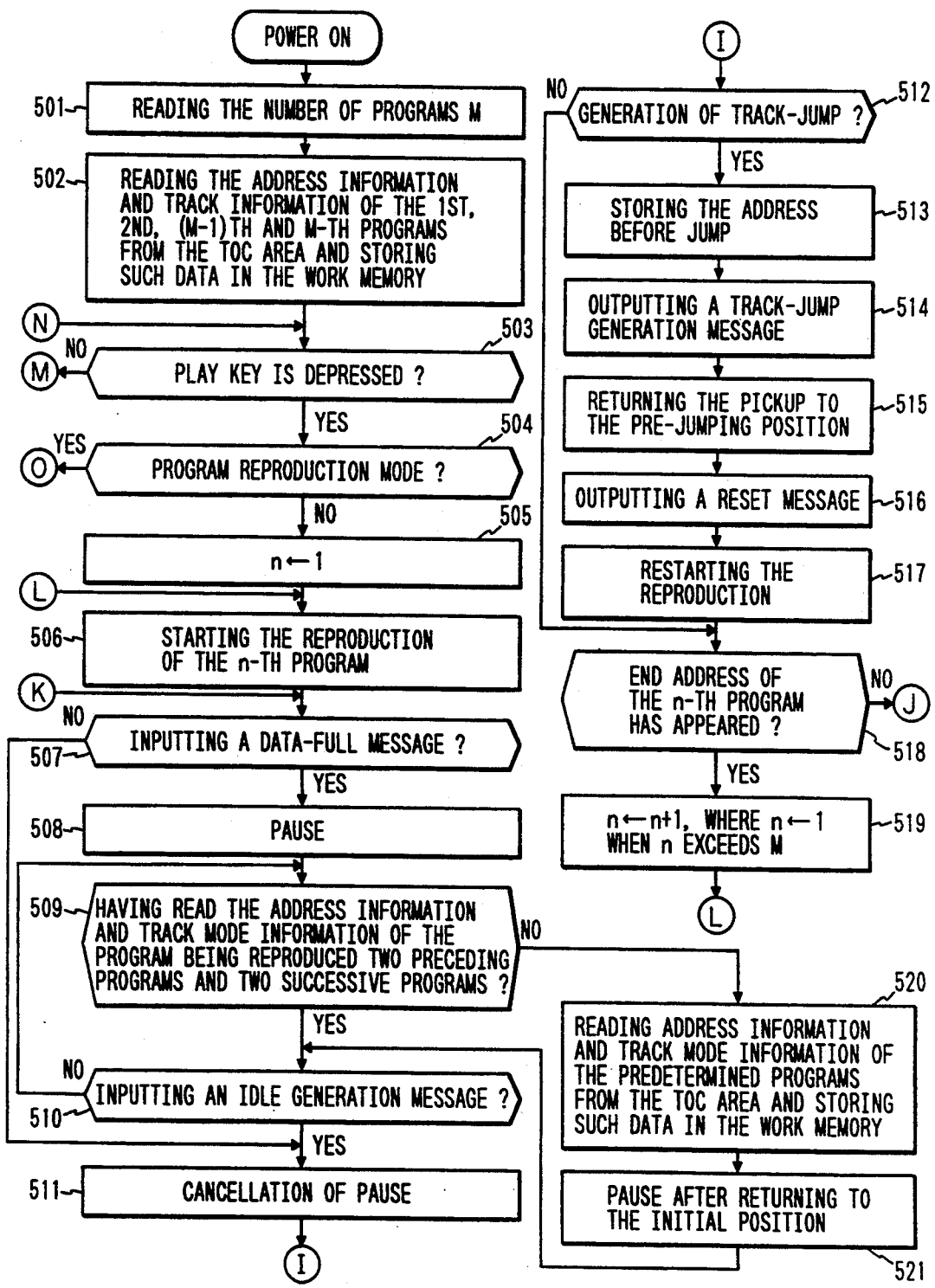
FIG. 9 is a first flowchart showing operations of a system controller in a second embodiment.
Figure 10:
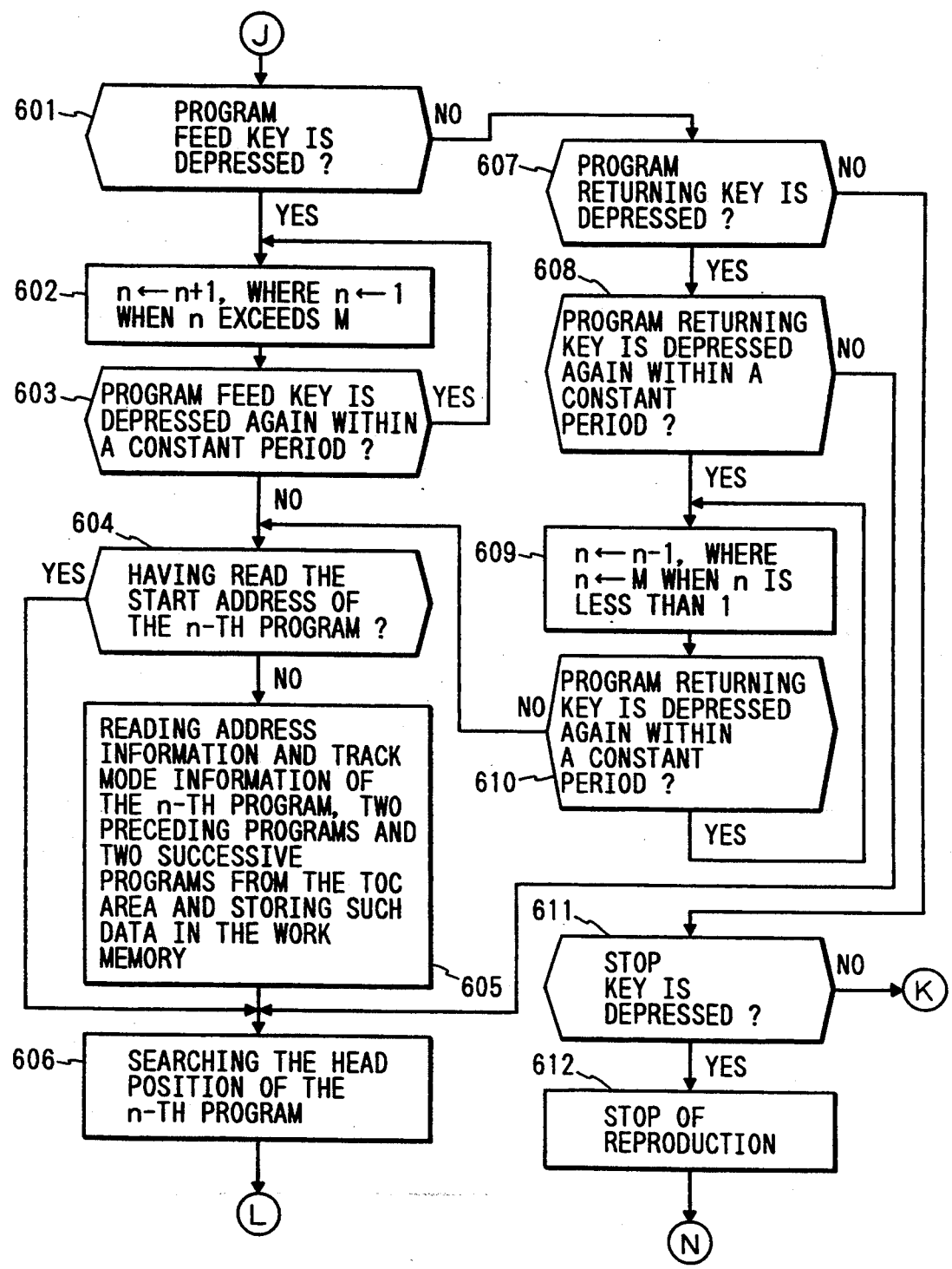
FIG. 10 is a second flowchart showing operations of a system controller of the second embodiment.

If the user intends to jump to the next program during reproduction of the third program by the program feed mode and depresses the program feed key on the operating panel 16 (refer to FIG. 14(B)E$_1$), the system controller 17 judges YES in step 601 of FIG. 10, increases n to 4 (step 110), confirms that the program returning key is not depressed within a period (NO in step 603) and searches the heading part of the fourth program based on the start address of the fourth program stored in the ring buffer memory region because the address information, etc. of the fourth program is stored in the ring buffer memory region (YES in step 604) to initiate reproduction of the fourth program. Then, the system controller 17 controls the audio circuits 14, 15 depending on the track mode of the fourth program (step 606, step 506 of FIG. 9, refer to FIG. 14 (B)E$_2$). As a result, when the program feed key is depressed during reproduction of the third program, reproduction of the fourth program can be initiated without reading the address information from the TOC area.

If the user twice depresses the program feed key within a short period during reproduction of the third program, the system controller 17 increments n twice to 5 (step 601, 602, 603, 602 in FIG. 10) and searches the heading part of the fifth program to initiate reproduction (steps 604, 606) because the address information, etc. of the fifth program is stored in the ring buffer memory region. Thereby, reproduction of the fifth program is started immediately.

When the program feed key is depressed three times during reproduction of the third program (refer to FIG. 14(C)F$_1$), n is incremented to 6 and the address information of the corresponding program number no longer remains in the ring buffer memory region (NO in step 604), the system controller 17 reads the address information and track mode information of the five programs (fourth program to eighth program) including the sixth program and two preceding and two succeeding programs thereof from the TOC area, stores this data in the locations P1 to P5 of the ring buffer memory region (refer to FIG. 14(C)F$_2$) and searches the heading part of the sixth program (steps 605, 606, refer to FIG. 13(C), FIG. 14(C)F$_3$).

On the contrary, when the user intends to return to the heading part of the third program during reproduction of the third program and depresses the program returning key on the operating panel 16, the system controller 17 judges YES in step 607, confirms that the program returning key is depressed within a period (NO in step 608) and searches the heading part of the third program with reference to the start address of the third program stored in the ring buffer memory region to restart reproduction (step 606, step 506 of FIG. 9).

When the user intends to return to the preceding program during reproduction of the third program and twice depresses the program returning key on the operating panel 16, the system controller 17 decrements n (NO in the steps 607 to 609, 610 Of FIG. 10) and searches the heading part of the second program based on the start address of the second program stored in the ring buffer memory region to initiate reproduction. Then, the system controller 17 controls the audio circuits 14, 15 depending on the track mode of the second program (steps 604, 606, step 506 of FIG. 9). As a result, reproduction of the second program can be started by immediately suspending reproduction of the third program.

If the user depresses the program returning key three times within a short period during reproduction of the third program, the system controller 17 decrements n twice to 1 (steps 607 to 610, 609), judges NO in step 610 and skips the operation to steps 604, 606. Thereby, reproduction of the first program is started.

Moreover, when the program feed key is depressed four times during reproduction of the third program, n is incremented to 20 and the address information of the corresponding program number no longer remains within the ring buffer memory region (NO in step 604), the system controller 17 reads the address information and track mode information of five programs including the 20th program and two preceding programs and two successive programs thereof (18th program, 19th program, 20th program, 1st program, 2nd program) from the TOC area, stores these data in the ring buffer memory region locations P1 to P5 together with the program numbers and thereafter searches the heading part of the 20th program (steps 605, 606).

When the user intends to stop reproduction during reproduction of the third program and depresses the STOP key on the operating panel 16, the system controller 17 executes the stop control for the servo circuit 6 to stop the reproduction (steps 611, 612 of FIG. 10).

Under this condition, when the user intends to reproduce the fifth program and depresses the PRG key on the operating panel 16 to set the program reproduction mode (steps 701 to 703) and depresses the program designating key to designate the program number 5, the program number 5 is stated as the reproduction program in the work memory 18 (steps 705 to 707). Thereafter, when the PLAY key is depressed, the system controller 17 sets n to 5 (steps 801, 802 of FIG. 12) which indicates the first program number because the system is now set to the program reproducing mode (YES in steps 503, 504 of FIG. 9), checks whether the address information of the fifth program is stored or not in the ring buffer memory region (step 803) and searches the heading part of the fifth program, because the result of the check is YES, with reference to the start address of the fifth program to initiate the reproduction. Then, the system controller 17 executes the necessary control for the audio circuits 14, 15 with reference to the track mode of the fifth program (steps 804, 805). Thereby, reproduction of the fifth program is immediately started.

Thereafter, reproduction of the fifth program proceeds and the address input from the digital signal processing circuit 8 matches the end address of the fifth program, the system controller 17 checks whether other programs exist or not (steps 806, 801), executes the stop control when other programs do not exist (step 802) and executes the processing as explained above in step 803.

Figure 11:
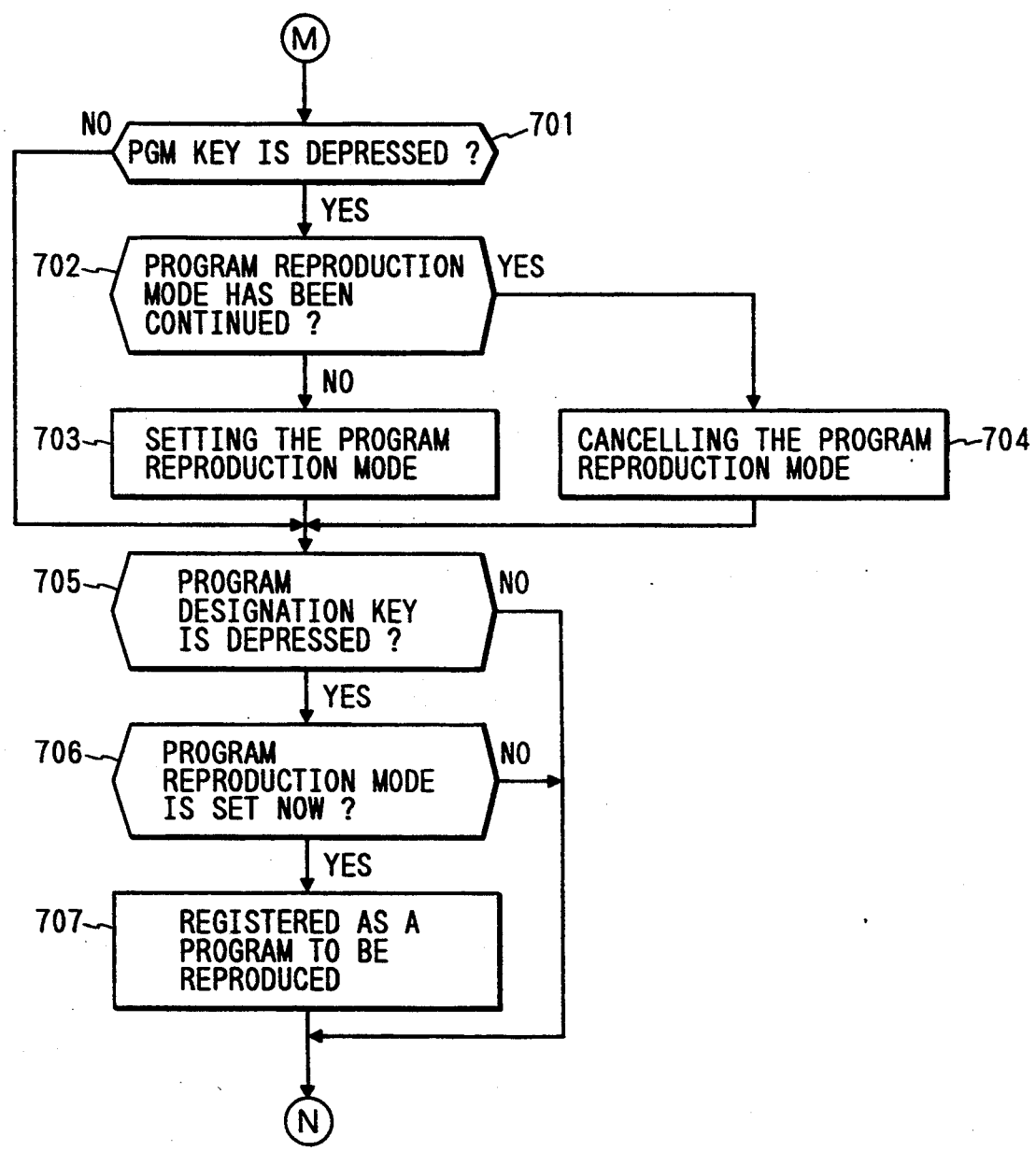
FIG. 11 is a third flowchart showing operations of a system controller of the second embodiment.
Figure 12:
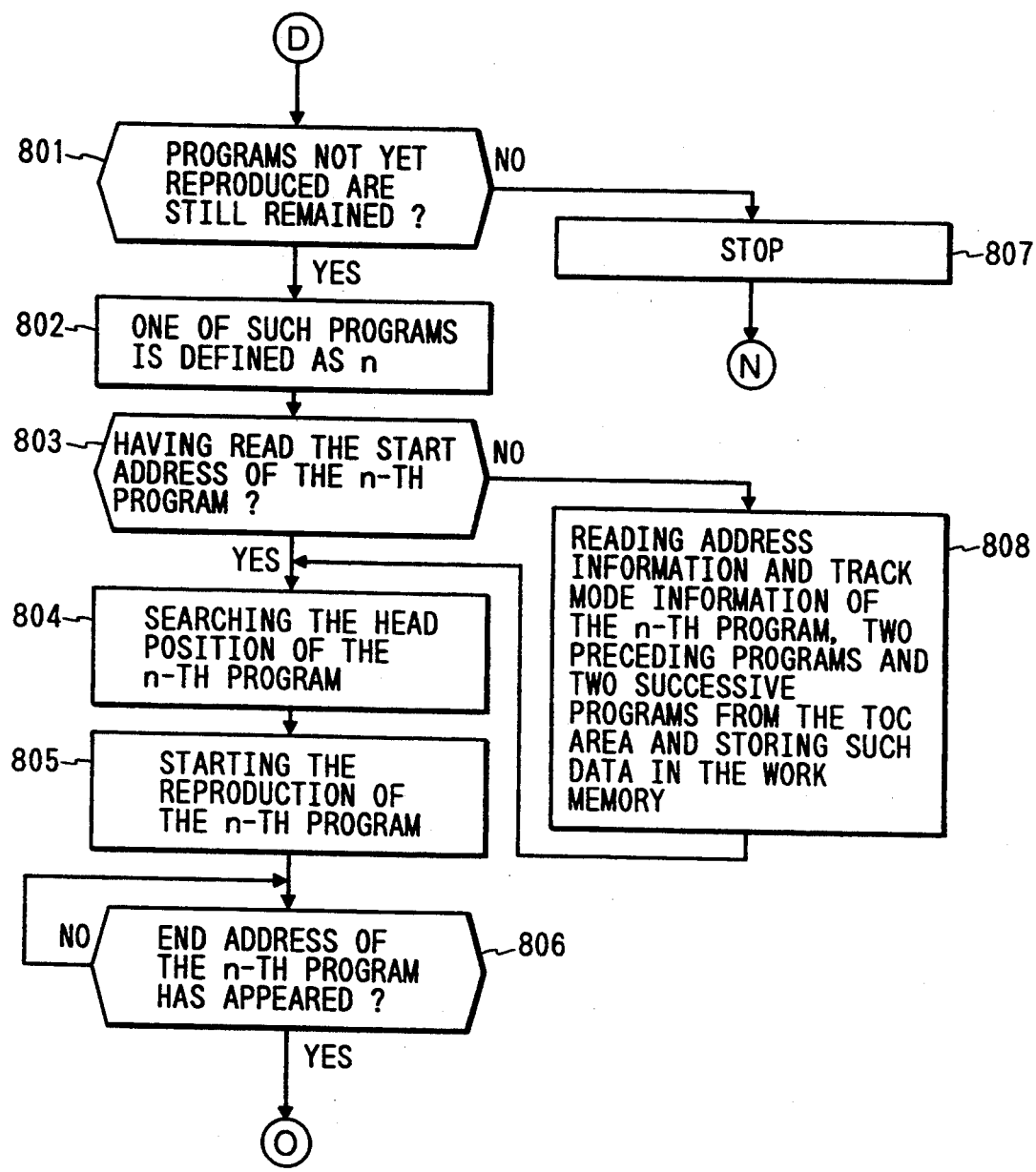
FIG. 12 is a fourth flowchart showing operations of a system controller of the second embodiment.

The program mode is canceled by depressing the PRG key (steps 301, 302, 304 of FIG. 11).

If the address information of a certain program is not stored in the ring buffer memory region, the system controller 17 reads the address information and track information of the five programs including the relevant program and two preceding and two successive programs from the TOC area (step 808) and the searches the heading part of the relevant program to initiate reproduction thereof (steps 804, 805).

According to this second embodiment, the address information and track mode information of all programs recorded on the disk are not read out and held in the work memory; instead only the address information and track information for five programs, including the program which is currently being reproduced and two preceding and two successive programs, are stored. Therefore, the work memory is required to store the address information and track mode information for only five programs. Accordingly, other sophisticated functions can be easily achieved by assigning the work memory to other processing such as character display or the like, or cost reduction and reduction in size can also be achieved by reducing the work memory capacity.

Moreover, reproduction of the selected programs is initiated immediately because it is no longer necessary to read the address information and track mode information of the five programs, including the program which is currently reproduced and two preceding and two successive programs, from the TOC area.

Also in the case of the second embodiment, the track mode information is read out together with the address information, but it is not always necessary to read the track mode information for a system which does not include the audio circuits 14, 15. Moreover, the address information and track information of the five programs, including the program which is currently reproduced and two preceding and two successive programs, are held in the work memory, but it is also possible to hold such data for other numbers of programs, for example, three programs or seven programs in total, including the program which is currently being reproduced.

Moreover, in the case of a disk player in which reproduction is automatically stopped when reproduction of the final program has been completed, reading of the end address can be omitted (judging whether the start address of the next program appears or not in the step 518 of FIG. 9) and thereby the memory capacity required for the ring buffer region is significantly reduced.

Figure 16:
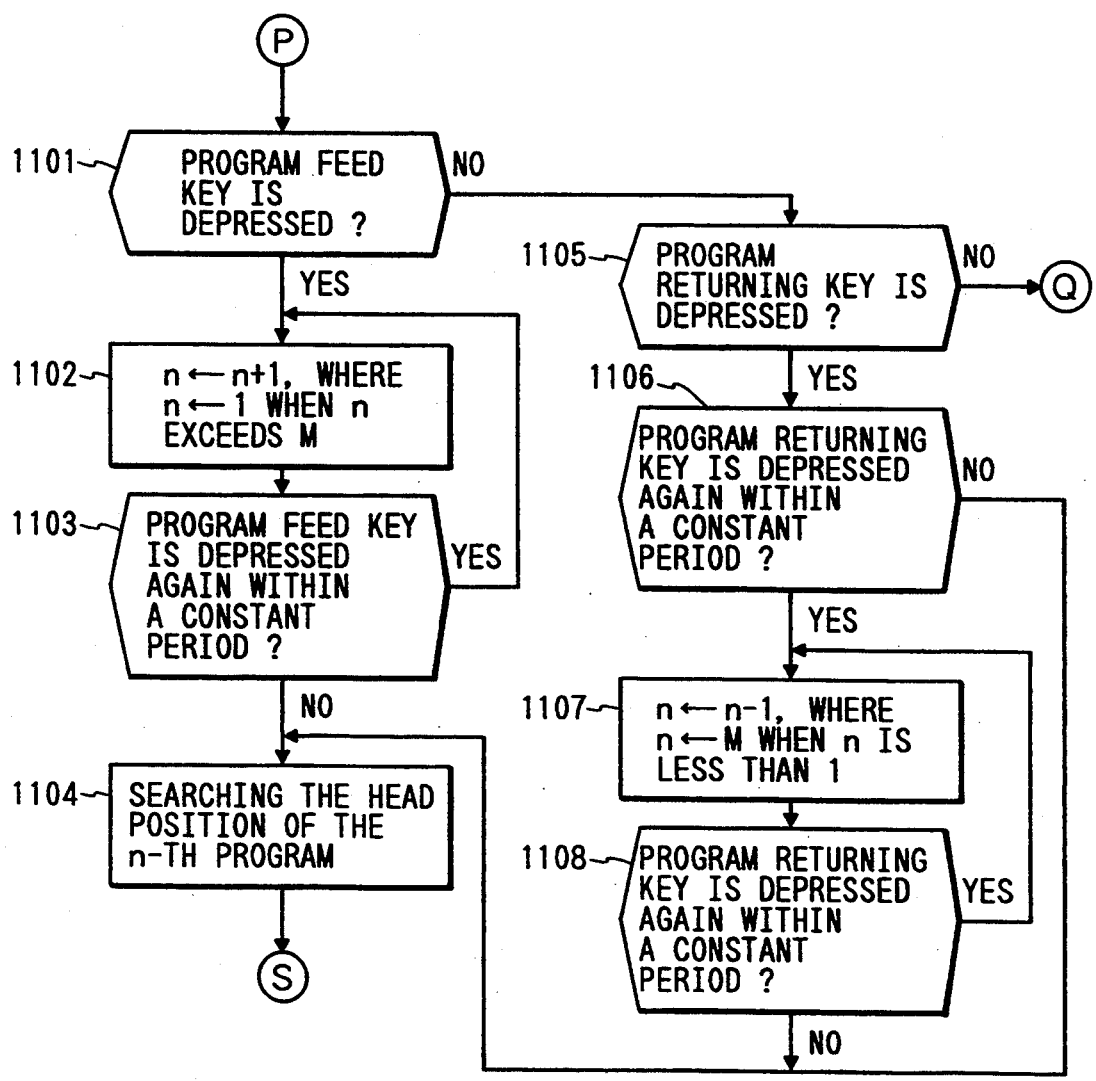
FIG. 16 is a second flowchart showing operations of a system controller of the third embodiment.

FIG. 15 and FIG. 16 are flowcharts if operation of the system controller relating to a third embodiment of the present invention.

It is also assumed here that a mini-disk (for reproduction only) recording 20 programs in total is inserted in the player.

When the power switch is turned ON, system controller 17 activates the servo, moves optical pickup 3 to the TOC area of disk read-in to read the number of programs M=20 recorded on a disk with the optical pickup 3, RF amplifier and digital signal processing circuit 8, thereafter stores such data into work memory 18 (step 901 of FIG. 15) and reads the start address and track mode information of 20 programs from the 1st to Mth (=20) programs and then stores the data in the work memory 18 (step 902).

Thereafter when the PLAY key is depressed, the system controller 17 sets n to 1 (steps 903, 904) and executes the de-emphasis ON/OFF control for the audio circuits 14, 15 depending on the track mode of the first program stored in the work memory 18 to start reproduction of the first program (step 905).

When the system controller 17 receives a datafull message from the shock-proof memory controller 10 during reproduction, it executes pause control to interrupt reading of compressed music data, holding the optical pickup 3 at the predetermined position on the disk. When the system controller 17 receives the vacant message, it executes pause cancellation control to restart reading of compressed music data from the position defined immediately before the pause of disk. Moreover, when a track jump detecting signal is input from RF amplifier 5, the system controller 17 stores the latest address in the subdata input from the digital signal processing circuit 8 in work memory 18, sends a track jump generation message to the shock-proof memory controller 10, returns the optical pickup 3 to the position defined before track jump, and thereafter sends a reset message to the shock-proof memory controller 10 to restart reproduction.

When reproduction proceeds and the address in the subdata input from the digital signal processing circuit 8 matches the start address of the (n+1)th program (YES in step 906), the system controller 17 increases n (step 907) and executes the de-emphasis ON/OFF control for the audio circuits 14, 15 depending on the track mode of the second program to start the second program (step 905).

With repetition of the processing in the same manner, a disk can be reproduced sequentially from the first program.

Thereafter, when reproduction of the final program (program number M=20) is complete and the readout area appears, the system controller 17 executes the stop control to stop reproduction (steps 908, 910).

For example, when the user intends to jump to the next program during reproduction of the third program and depresses the program feed key on the operating panel 16, the system controller 17 judges YES in step 1101 of FIG. 16, increases n to 4 (step 1102), confirms that the program feed key is not depressed within a period (step 1103), thereafter searches the heading part of the fourth program based on the start address of the fourth program stored in the work memory 18 (step 1104) and starts reproduction of the fourth program after the search operation. Then, the system controller 17 controls the audio circuits 14, 15 depending on the track mode of the fourth program (step 905 of FIG. 15). As a result, reproduction of the fourth program is started immediately by interrupting reproduction of the third program.

If the user depresses the program feed key k times within a short period during reproduction of the third program, the system controller 17 increases n k times to (3+k) (repetition of steps 1101 to 1103, 1102, 1103), proceeding the operation to step 1104. Thereby, the system controller 17 can quickly start reproduction of the (3+k)th program.

In step 1102, when n is incremented to be larger than M (n>M), n is set to equal to 1 (n=1). Thereby, reproduction of the first program of a disk is started only by operating the program feed key.

On the contrary, when the user intends to return to the heading part of the third program during reproduction of the third program and depresses the program returning key on the operating panel 16, the system controller 17 judges YES in step 1105, then confirms that the program returning key is not depressed within a predetermined period (step 1106) and thereafter searches the heading part of the third program by referring to the start address of the third program stored in the work memory 18 to start reproduction (step 1104, step 905 of FIG. 15).

Moreover, when the user intends to return to the preceding program during reproduction of the third program and depresses twice the program returning key on the operating panel 16, the system controller 17 decrements n (steps 1105 to 1108, 1107), searches the heading part of the second program based on the start address of the second program stored in the work memory 18 to start reproduction. Then, the system controller 17 controls the audio circuits 14, 15 depending on the track mode of the second program (step 1104, step 905 of FIG. 15). As a result, the system controller 17 can quickly start reproduction of the second program by interrupting reproduction of the third program.

When n becomes smaller than 1 (n<1) by decrementing, n is set equal to M (n=M) in step 1107. Thereby, the system controller 17 can return to reproduction of the last program on the disk only in response to depressing of the program returning key.

According to this third embodiment, since only the start addresses of the programs stored on the disk are stored, the work memory does not need the capacity for storing the end addresses of the 255 programs. Meanwhile, any program selected by operation of the program feed key and program returning key can be reproduced immediately.

In the third embodiment, the track mode information is also read together with the address information, but it is not always necessary to read the track mode information for a disk player not including the audio circuits 14, 15.

In each embodiment described above, a mini-disk for reproduction only is used, but the present invention is not limited thereto and is applicable to a mini-disk used both for recording and reproduction, and also a compact disk. In the case of a mini-disk used both for recording and reproduction, the address information and track mode information of respective programs are read for the first UTOC area of the program area and reproducing position on the disk is observed on the basis of the address read by the address decoder 7 of FIG. 1.

According to the present invention, in the case of selecting reproducing of a desired program, when the desired program is selected, the position information for the desired program is read from the TOC area of the disk and the position corresponding to the desired program in the disk is searched to start reproduction thereof. Accordingly, it is no longer necessary to read the position information of each program from the TOC area and then store it in the work memory. Thereby, the capacity of the work memory is significantly reduced, the memory area required for other tasks is obtained easily, or cost reduction and memory size reduction are easily achieved by saving the required memory capacity.

Moreover, in such a disk system where reproduction is realized by intermittently reading data at high speed from a disk on which position information of each program is stored in the TOC area, then storing such data into the data memory and continuously reading such data from the data memory at a normal speed, on the occasion of selecting and reproducing a desired program by reading the position information of a desired program from the TOC area while reading from the disk is interrupted and then storing such data into the work memory so that the position information of the predetermined number of continuous programs including a program which is currently reproduced can always be held in the work memory, the position information of a desired program is read from the work memory when the desired program is selected and the heading position corresponding to the desired program on the disk is searched to .start reproduction of the desired program. Accordingly, the desired program can be quickly selected and reproduced for the program within the predetermined range, including a program which is currently being reproduced, by assigning only limited memory capacity to store the position information of the programs.

In addition, on the occasion of selecting and reproducing a desired program by reading starting position information of all programs from the TOC area of a disk and storing such data in the work memory, the starting position of the desired program is read from the work memory when the desired program is selected and the starting position corresponding to the desired program on the disk is searched to start reproduction of the desired program. Thereby, even when the starting position information and ending position information of programs are recorded in the TOC area of the disk, the capacity required for the work memory to store position information is significantly reduced, and moreover all programs recorded on the disk can be selected and reproduced quickly.

What is claimed is:

1. A disk reproducing method in a disk system for reproducing a disk, the method comprising the steps of:
   intermittently reading data at a high speed from disk recording position information of each program on the disk in a table of contents area of the disk;
   storing such data into a data memory; and
   then reading such data continuously from the memory at a normal speed;
   wherein when selecting and reproducing a desired program by reading the position information of a desired program from the table of contents area while reading data from the disk is interrupted, and then such data is stored into a work memory so that the position information of a predetermined number of programs including a program which is currently being reproduced are held in the work memory, the position information of the desired program is read from the work memory when the desired program is selected and reproduction is started after searching a corresponding position of the desired program on the disk.

2. A disk reproducing method according to claim 1, wherein said disk is a mini-disk.

3. A disk reproducing method according to claim 1 wherein said position information includes start address, end address and track mode information.

4. A disk reproducing method according to claim 1, wherein said data memory is DRAM.

5. A disk reproducing method according to claim 1, wherein the position information is stored in a memory area of a ring buffer region of said work memory.

6. A disk reproducing method according to claim 1, wherein reading of data from said disk is interrupted during a pause mode caused by a data-full condition.

7. A disk reproducing method according to claim 6, further comprising the step of checking whether position information of a predetermined number of programs is stored in the pause mode.

8. A disk reproducing method according to claim 1, wherein the desired program is searched after reading the information from the table of contents area when the position information of the predetermined number of programs for the selected programs is not yet stored.

9. A disk reproducing apparatus comprising:
   a disk having a program area recording program data and a table of contents area which records position information of each program;
   a work memory;
   a data memory for storing program data in a program area thereof;
   a memory controller for intermittently reading data from said disk at a high speed, writing data into said data memory, and continuously reading data from said data memory at a normal speed; and
   a system controller for reading position information of a desired program from the table of contents area and storing such information into the work memory when reading of program data from the disk is interrupted, so that the position information of a predetermined number of programs including a program which is currently being reproduced from the disk is held in the work memory, reading position information of the desired program from the work memory when the desired program is selected, and then starting reproduction after searching a corresponding position of the desired program on the disk.

10. A disk reproducing apparatus according to claim 9, wherein said disk is a mini-disk.

11. A disk reproducing apparatus according to claim 9, wherein said position information includes start address, end address and track mode information.

12. A disk reproducing apparatus according to claim 9, wherein said data memory is DRAM.

13. A disk reproducing apparatus according to claim 9, wherein said position information is stored in a memory area of a ring buffer region of said work memory.

* * * * *